United States Patent
Staines et al.

(10) Patent No.: US 11,946,726 B2
(45) Date of Patent: Apr. 2, 2024

(54) SYNCHRONIZATION OF HIGH POWER RADIOFREQUENCY SOURCES

(71) Applicant: GENERAL ATOMICS, San Diego, CA (US)

(72) Inventors: Geoff Staines, San Diego, CA (US); Brian Paul Cluggish, San Diego, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 17/874,132

(22) Filed: Jul. 26, 2022

(65) Prior Publication Data

US 2024/0035781 A1  Feb. 1, 2024

(51) Int. Cl.
| | | |
|---|---|---|
| *F41H 13/00* | (2006.01) | |
| *G01S 7/4865* | (2020.01) | |
| *G01S 17/10* | (2020.01) | |

(52) U.S. Cl.
CPC ........ *F41H 13/0068* (2013.01); *G01S 7/4865* (2013.01); *G01S 17/10* (2013.01)

(58) Field of Classification Search
CPC ............. F41H 13/0068; F41H 13/0043; F41H 13/0075; F41H 11/32; F41H 13/0093; G01S 7/4865; G01S 17/10; G01S 13/42; G01S 13/003; G01S 13/72; G01S 13/76; G01S 13/87; G01S 15/876; G01S 5/0289; G01S 5/30; G01S 7/282; G01S 13/0209; G01S 17/66; G01S 19/015; G01S 19/14; G01S 19/36; G01S 2013/0254; G01S 5/0027; G01S 7/006; G01S 7/4008; G01S 7/4815; G01S 7/4911; H01Q 3/22; H01Q 21/0025; H01Q 3/26; H01Q 1/325; H01Q 13/02; H01Q 19/062; H01Q 19/17; H01Q 19/19;
(Continued)

(56) References Cited

U.S. PATENT DOCUMENTS

| | | | |
|---|---|---|---|
| 4,521,893 A | 6/1985 | Bellman | |
| 4,683,474 A | 7/1987 | Randig | |

(Continued)

FOREIGN PATENT DOCUMENTS

| | | |
|---|---|---|
| KR | 20200044702 | 4/2020 |
| WO | 2005104395 | 11/2005 |
| WO | 2007059508 | 5/2007 |

*Primary Examiner* — Thanh Luu
*Assistant Examiner* — Monica T Taba
(74) *Attorney, Agent, or Firm* — Fitch, Even, Tabin & Flannery LLP

(57) ABSTRACT

The range of energy transmissions or bursts (e.g., the range of high power microwave (HPM) directed energy weapons) may be increased using multiple sources (e.g., multiple HPM sources). For instance, according to techniques described herein, the individual sources may be fired at precise times such that the electromagnetic pulses are efficiently generated by each source and accurately add waveform peaks on the target. One or more aspects of the described techniques achieve sub-nanosecond timing accuracy by placing an HPM source, ultra-stable clock, and a laser pulse detector on each HPM weapon platform. For instance, the array may be triggered by firing a laser pulse at the target from one platform. By timing the firing of each HPM source based upon when the reflected laser pulse arrives at each platform as measured by the clock, the HPM pulses may arrive on target more accurately (e.g., more simultaneously).

22 Claims, 9 Drawing Sheets

(58) Field of Classification Search
CPC .......... H01Q 21/00; H01Q 21/22; H01Q 3/02; H01Q 3/24; H01Q 3/385; H01Q 9/005; H04B 7/024; H04B 7/06; H04K 2203/34; H04K 3/42; H04K 3/62; H04K 2203/24; H04K 2203/32; H04K 3/28; H04K 3/41; H04K 3/45; H04K 3/65; H04W 56/0015; H04W 56/0025; H04W 84/18; B64G 1/1021; B64G 1/1035; B64G 1/1085; B64G 3/00; F41G 3/04; F41G 3/145; F41G 5/08; G02B 27/0087; H03B 11/02; H03F 2200/451; H03F 3/54; H03F 3/602; H05H 1/46

See application file for complete search history.

(56) References Cited

U.S. PATENT DOCUMENTS

| | | | |
|---|---|---|---|
| 4,843,397 A * | 6/1989 | Galati | B64G 3/00 342/368 |
| 5,084,706 A | 1/1992 | Ross | |
| 5,339,086 A | 8/1994 | DeLuca | |
| 5,455,593 A | 10/1995 | Ross | |
| 5,896,105 A | 4/1999 | Murphy | |
| 7,051,636 B1 | 5/2006 | Snow | |
| 7,126,530 B2 | 10/2006 | Brown | |
| 7,164,234 B2 | 1/2007 | Achenbach | |
| 7,804,741 B1 | 9/2010 | Snow | |
| 7,813,223 B1 | 10/2010 | Snow | |
| 7,826,839 B1 | 11/2010 | Nicholas | |
| 7,876,261 B1 | 1/2011 | Adams | |
| 8,350,750 B2 | 1/2013 | Paek | |
| 8,575,528 B1 | 11/2013 | Barchers | |
| 10,177,822 B2 | 1/2019 | Smith | |
| 11,209,247 B2 | 12/2021 | Stark | |
| 2006/0038714 A1 | 2/2006 | Osepchuk | |
| 2011/0253910 A1 | 10/2011 | Beck Keissary | |
| 2012/0127020 A1 * | 5/2012 | Paek | G01S 13/42 342/103 |
| 2012/0188125 A1 | 7/2012 | Pomietlasz | |
| 2012/0212363 A1 | 8/2012 | Brasile | |
| 2013/0002472 A1 * | 1/2013 | Crouch | G01S 7/4863 342/370 |
| 2017/0191804 A1 * | 7/2017 | Stark | F41H 13/0093 |
| 2018/0020416 A1 | 1/2018 | Smith | |
| 2018/0058826 A1 | 3/2018 | Podgorski | |

* cited by examiner

SYNCHRONIZATION OF HIGH POWER RADIOFREQUENCY SOURCES

BACKGROUND OF THE INVENTION

1. Field of the Invention

The present invention relates generally to electromagnetic systems, and more specifically to synchronization of high power radiofrequency sources.

2. Discussion of the Related Art

Various systems and processes are known in the art for synchronization of high power radiofrequency sources.

Current systems for synchronization of radiofrequency (RF) radiation heavily rely on communication between RF radiation platforms (e.g., and/or between the RF radiation platforms and a target). If the RF radiation platforms are networked such that each one knows the location of the others and the location of the target then the timing of the triggering of each weapon can be controlled such that the high power microwave (HPM) radiation from all the platforms arrives simultaneously on the target. However, this is extremely difficult (e.g., especially at the gigahertz frequencies used in in certain weapons, such as HPM weapons). For example, at a frequency of 1 GHz the wavelength of the radiation is 30 cm. To synchronize the HPM weapons with sufficient accuracy the locations of each platform and the target must be known with an accuracy much smaller than a wavelength (e.g., such as 3 cm).

Accordingly, conventional systems may be deficient as such accuracy may not achievable for moving platforms (e.g., especially in a hostile environment where the platforms and/or target may be rapidly moving in an unpredictable manner and GPS may not be available). Improved synchronization techniques for high power radiofrequency sources may be desired.

SUMMARY

An apparatus, system, and method for synchronization of high power radiofrequency sources are described. One or more aspects of the apparatus, system, and method include a directional photon source configured to direct a pulse of photons at a target, wherein the pulse of photons is reflected by the target. One or more aspects of the apparatus, system, and method include a first high power radio frequency platform. One or more aspects of the apparatus, system, and method include a first synchronized clock, generating a first periodic clock signal comprising at least a first clock pulse. One or more aspects of the apparatus, system, and method include a first high power radio frequency emission source, generating a first high power radio frequency emission in response to a first trigger signal. One or more aspects of the apparatus, system, and method include a first photon detector configured to receive a first reflection of the pulse of photons at a first time, wherein the first time varies as a function of a first distance travelled by the first reflection. One or more aspects of the apparatus, system, and method include a first triggering system configured to measure a first time difference between the first time and a first clock pulse of the first periodic clock signal, wherein the first clock pulse is the next first periodic clock signal pulse after the first time, and further configured to generate the first trigger signal in response to the first time difference; a second high power radio frequency platform. One or more aspects of the apparatus, system, and method include a second periodic clock synchronized with the first clock, generating a second periodic clock signal comprising a second clock pulse, wherein the second periodic clock signal is synchronized with the first periodic clock signal. One or more aspects of the apparatus, system, and method include a second high power radio frequency emission source, generating a second high power radio frequency emission in response to a second trigger signal. One or more aspects of the apparatus, system, and method include a second photon detector configured to receive a second reflection of the pulse of photons at a second time, wherein the second time varies as a function of a second distance travelled by the second reflection. One or more aspects of the apparatus, system, and method include a second triggering system configured to measure a second time difference between the second time and a second clock pulse of the second periodic clock signal, wherein the second clock pulse is the next second periodic clock signal pulse after the second time, and further configured to generate the second trigger signal in response to the second time difference, wherein the second trigger signal is configured to cause the second high power radio frequency emission source to generate the second high power radio frequency emission to constructively interfere with the first high power radio frequency emission at the target.

A method, apparatus, non-transitory computer readable medium, and system for synchronization of high power radiofrequency sources are also described. One or more aspects of the method, apparatus, non-transitory computer readable medium, and system include directing a pulse of photons at a target, wherein the pulse of photons is reflected by the target. One or more aspects of the method, apparatus, non-transitory computer readable medium, and system include generating a first periodic clock signal comprising at least a first clock pulse. One or more aspects of the method, apparatus, non-transitory computer readable medium, and system include receiving a first reflection of the pulse of photons at a first time, wherein the first time varies as a function of a first distance travelled by the first reflection. One or more aspects of the method, apparatus, non-transitory computer readable medium, and system include measuring a first time difference between the first time and a first clock pulse of the first periodic clock signal, wherein the first clock pulse is the next first periodic clock signal pulse after the first time, and generating a first trigger signal in response to the first time difference. One or more aspects of the method, apparatus, non-transitory computer readable medium, and system include generating a first high power radio frequency emission in response to the first trigger signal and generating a second periodic clock signal comprising a second clock pulse, wherein the second periodic clock signal is synchronized with the first periodic clock signal. One or more aspects of the method, apparatus, non-transitory computer readable medium, and system include receiving a second reflection of the pulse of photons at a second time, wherein the second time varies as a function of a second distance travelled by the second reflection and measuring a second time difference between the second time and a second clock pulse of the second periodic clock signal, wherein the second clock pulse is the next second periodic clock signal pulse after the second time. One or more aspects of the method, apparatus, non-transitory computer readable medium, and system include generating a second trigger signal in response to the second time difference, wherein the second trigger signal is configured to cause the second high power radio frequency emission to constructively interfere with the first high power radio frequency emission at the target, and generating a second high power radio frequency emission in response to the second trigger signal.

DETAILED DESCRIPTION

Figure 1:
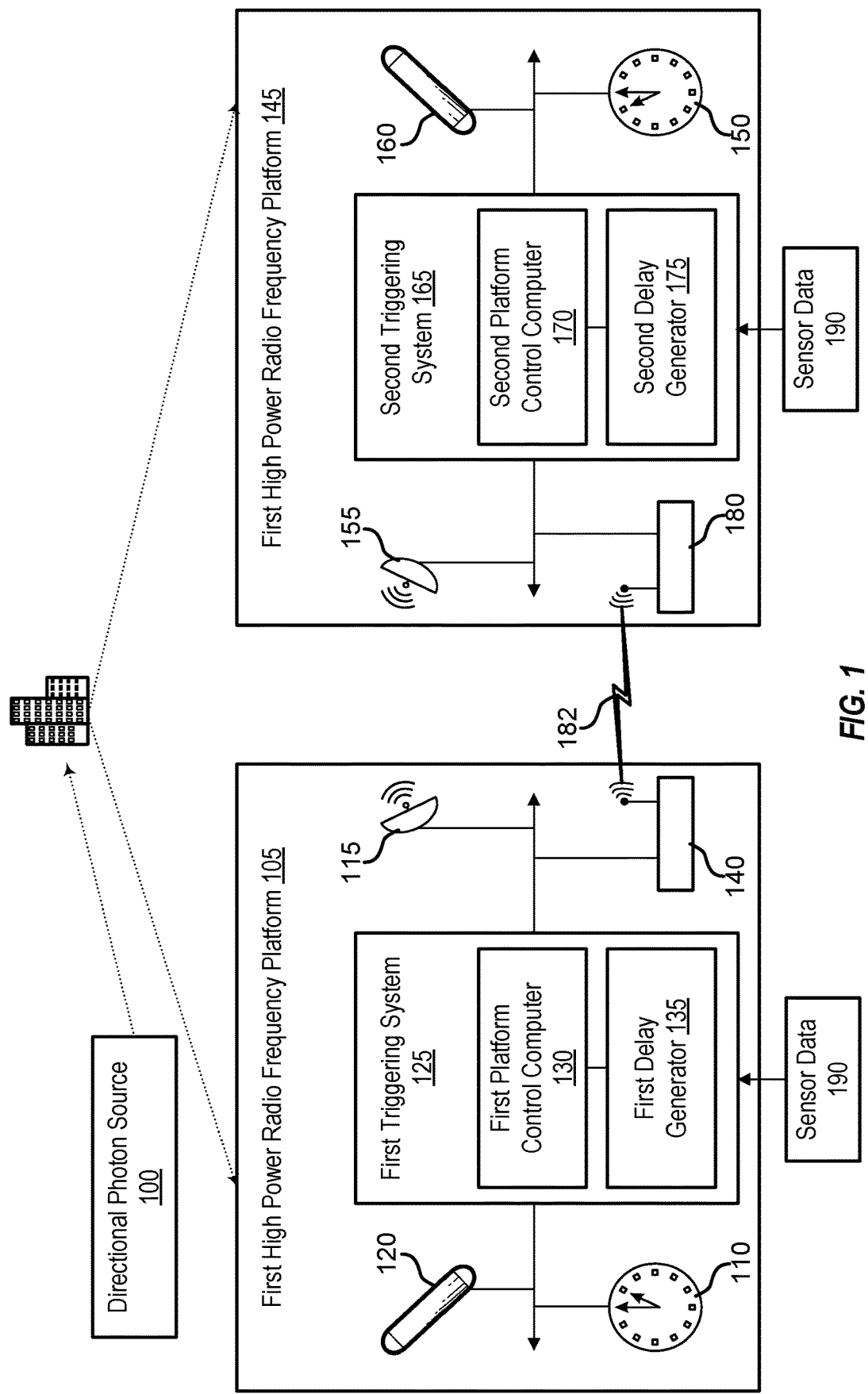
FIGS. 1 through 3 show examples of a system for synchronization of high power radio frequency sources according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The range of energy transmissions or bursts (e.g., the range of high power microwave (HPM) directed energy weapons) may be increased using multiple sources (e.g., multiple HPM sources). For instance, according to techniques described herein, the individual sources may be fired at precise times such that the electromagnetic pulses are efficiently generated by each source and accurately add up waveform peaks on the target. One or more aspects of the described techniques achieve sub-nanosecond timing accuracy by placing an HPM source, ultra-stable clock, and a laser pulse detector on each platform (e.g., such as each HPM weapon platform). For instance, the array of HPM sources may be triggered by firing a laser pulse at the target from one platform. By timing the firing of each HPM source based upon when the reflected laser pulse arrives at each platform as measured by the clock, the HPM pulses may arrive on target more accurately (e.g., more simultaneously). In some examples, no communication is necessary between the sources (e.g., except for the general location of the target and occasional communications for synchronization of the clocks on each platform). In some aspects, because the laser pulse is detected by each platform, the precise location of the platforms and target may not necessarily be known. Further, the laser may provide much higher spatial resolution in designating the target (e.g., compared to other systems using, for example, a RADAR wave).

FIG. 1 shows an example of a system for synchronization of high power radio frequency sources according to aspects of the present disclosure. The example shown includes directional photon source 100, first high power radio frequency platform 105, second high power radio frequency platform 145, and communications channel 182.

In some examples, techniques described with reference to FIG. 1 may be used to synchronize multiple, distributed high power microwave directed energy weapons for electronic attack. In some aspects, "distributed" may refer to each HPM weapon being on a different platform (e.g., such as first high power radio frequency emission source 115 on first high power radio frequency platform 105 and second high power radio frequency emission source 155 on second high power radio frequency platform 145), without any wired connection between the platforms.

For example, if the weapons are properly synchronized with a timing error that is much less than the period of the HPM radiation, then waveform peaks of the HPM pulses will arrive substantially simultaneously on a target. The HPM electric field on the target will then be multiplied by the number of platforms. Such may increase the system performance by giving a higher electromagnetic intensity on target and/or allowing attack from a longer range. In addition, in some cases, a distributed HPM system on many small platforms may be less vulnerable to attack than a single, large system, thus increasing the chance of mission success. Additionally, HPM pulses are often wideband, containing a wide range of different frequencies. Even when the HPM pulses include different frequencies, the present invention synchronizes the waveform peaks of the HPM pulses so that they are additive. If the pulses are the same frequency, and the timing errors are small enough, there exists an added benefit of the pulses also being in phase. However, synchronizing the pulses on the target is advantageous even if the pulses are not in phase and/or the same frequency.

For example, in FIG. 1, directional photon source 100 may be configured to direct a pulse of photons at a target, wherein the pulse of photons is reflected by the target.

In one aspect, first high power radio frequency platform 105 includes first synchronized clock 110, first high power radio frequency emission source 115, first photon detector 120, first triggering system 125, and first communications interface 140.

According to some aspects, first synchronized clock 110 is configured to generate a first periodic clock signal comprising at least a first clock pulse. First synchronized clock 110 is an example of, or includes aspects of, the corresponding element described with reference to FIGS. 3 and 4.

According to some aspects, first high power radio frequency emission source 115 is configured to generate a first high power radio frequency emission in response to a first trigger signal. First high power radio frequency emission source 115 is an example of, or includes aspects of, the corresponding element described with reference to FIG. 3.

According to some aspects, first photon detector 120 is configured to receive a first reflection of the pulse of photons at a first time, wherein the first time varies as a function of a first distance travelled by the first reflection. First photon detector 120 is an example of, or includes aspects of, the corresponding element described with reference to FIGS. 3 and 4.

According to some aspects, first triggering system 125 is configured to measure a first time difference between the first time and a first clock pulse of the first periodic clock signal, wherein the first clock pulse is the next first periodic clock signal pulse after the first time. First triggering system 125 is further configured to generate the first trigger signal in response to the first time difference. In some aspects, the first triggering system 125 includes a first platform control computer 130 and a first delay generator 135. In some aspects, the first platform control computer 130 is configured to receive a first reflection signal in response to the first reflection, receive the first clock pulse from the first synchronized clock 110, and determine the first time difference. In some aspects, the first delay generator 135 is coupled to the first platform control computer 130 and is configured to generate the first trigger signal in response to the first time difference.

In some aspects, the second triggering system 165 includes a second platform control computer 170 and a second delay generator 175. In some aspects, the second platform control computer 170 is configured to receive a second reflection signal in response to the second reflection, receive the second clock pulse from the second synchronized clock 150, and determine the second time difference. In some aspects, the second delay generator 175 is coupled to the second platform control computer 170 and is configured to generate the second trigger signal in response to the second time difference.

In one aspect, first triggering system 125 includes first platform control computer 130 and first delay generator 135. First platform control computer 130 is an example of, or includes aspects of, the corresponding element described with reference to FIG. 4. First delay generator 135 is an example of, or includes aspects of, the corresponding element described with reference to FIGS. 3 and 4.

In some aspects, first triggering system 125 and/or second triggering system 165 are configured to receive sensor data 190 and use the sensor data 190 to reduce timing errors due to one or more of platform motion, environmental effects, and clock drift. In some embodiments the sensor data 190 is real-time sensor data. In some embodiments the sensor data 190 is at least one of platform speed, platform altitude, air pressure, temperature and humidity.

In some aspects, the second high power radio frequency platform 145 includes a second communications interface 180, where the second communications interface 180 is configured to provide the synchronization information to the second synchronized clock 150, where the second communications interface 180 is coupled to the first communications interface 140 via a communications channel 182, and where the synchronization information is communicated via the communications channel 182.

In one aspect, second high power radio frequency platform 145 includes second synchronized clock 150, second high power radio frequency emission source 155, second photon detector 160, second triggering system 165, and second communications interface 180.

According to some aspects, second synchronized clock 150 is configured to generate a second periodic clock signal comprising a second clock pulse, wherein the second periodic clock signal is synchronized with the first periodic clock signal. Second synchronized clock 150 is an example of, or includes aspects of, the corresponding element described with reference to FIG. 3.

According to some aspects, second high power radio frequency emission source 155 is configured to generate a second high power radio frequency emission in response to a second trigger signal. Second high power radio frequency emission source 155 is an example of, or includes aspects of, the corresponding element described with reference to FIG. 3.

According to some aspects, second photon detector 160 is configured to receive a second reflection of the pulse of photons at a second time, wherein the second time varies as a function of a second distance travelled by the second reflection. Second photon detector 160 is an example of, or includes aspects of, the corresponding element described with reference to FIG. 3.

According to some aspects, second triggering system 165 is configured to measure a second time difference between the second time and a second clock pulse of the second periodic clock signal, wherein the second clock pulse is the next second periodic clock signal pulse after the second time. Second triggering system 165 is further configured to generate the second trigger signal in response to the second time difference, wherein the second trigger signal is configured to cause the second high power radio frequency emission source 155 to generate the second high power radio frequency emission to constructively interfere with the first high power radio frequency emission at the target.

In one aspect, second triggering system 165 includes second platform control computer 170 and second delay generator 175. Second delay generator 175 is an example of, or includes aspects of, the corresponding element described with reference to FIG. 3.

First high power radio frequency platform 105 is an example of, or includes aspects of, the corresponding element described with reference to FIGS. 3 and 5. Second high power radio frequency platform 145 is an example of, or includes aspects of, the corresponding element described with reference to FIGS. 3 and 5.

In some aspects, synchronization timing errors are reduced. Timing errors can be introduced from multiple sources. For example, the speed of light of the photon source (laser beam) in air is not exactly the same as the speed of light of the RF waves in the HPM pulse. In another example, high power radio frequency platforms may be moving during the time between the detection of the reflection and the triggering of the HPM sources. Timing error may also be introduced via the equipment used, e.g. HPM sources, clocks, etc. In one aspect, the net timing error from all sources is much less than the period of the HPRF waves.

In one aspect, for a HPM frequency of approximately 1 GHz, timing errors are acceptably reduced for HPM pulses desired to be generally in phase when the first high power radio frequency platform 105 and the second high power radio frequency platform 145 are less than one kilometer apart from one another and the first high power radio frequency platform 105 and the second high power radio frequency platform 145 have respective speeds of less than five hundred kilometers per hour relative to Earth.

In other embodiments, timing errors are compensated for based on the real-time environmental conditions. In one example, the $\Delta t$ for each high power radio frequency platform is adjusted to compensate for the applicable timing errors using information that is available to each high power radio frequency platform. For example, Δt for a moving platform is adjusted based on the platform speed to compensate for the platform motion. Δt for the platforms can be adjusted to compensate for the difference in light speed. These adjustments can often be made without any additional communication between the high power radio frequency platforms.

In some aspects, the first high power radio frequency platform 105 includes a first communications interface 140, where the first communications interface 140 is configured to provide synchronization information to the first synchronized clock 110. In some aspects, the first high power radio frequency platform 105 is coupled to a first unmanned aerial vehicle. In some aspects, the second high power radio frequency platform 145 is coupled to a second unmanned aerial vehicle.

Figure 2:
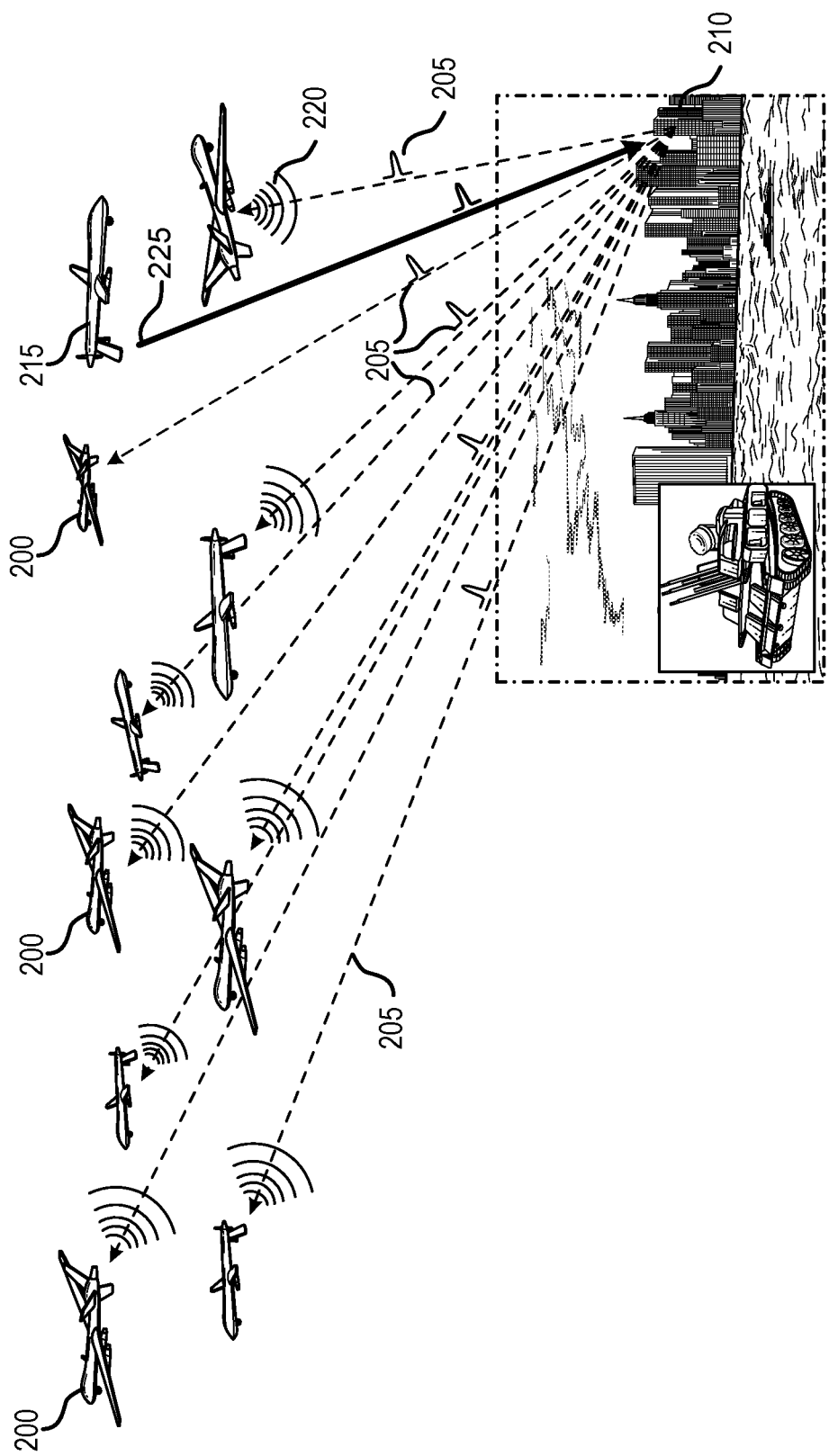

FIG. 2 shows an example of a system for synchronization of high power radio frequency sources according to aspects of the present disclosure. The example shown includes unmanned aerial vehicles 200, reflected laser pulses 205, target 210, targeting/monitoring aircraft 215, a plurality of radiated HPM pulses 220, and laser pulse 225.

FIG. 2 illustrates aspects of techniques for increasing the range of energy transmissions or energy bursts (e.g., the range of high power microwave (HPM) directed energy weapons of unmanned aerial vehicles 200) by using multiple sources (e.g., multiple unmanned aerial vehicles 200 that each include HPM sources for generating the HPM pulses 220).

Also shown is targeting/monitoring aircraft 215. In some embodiments (such as the one of FIG. 2) the targeting/monitoring aircraft 215 may be the platform that is carrying the laser and fires the laser pulse 225 at the target 210. In other embodiments the laser may be carried on one of the HPM platforms. The laser pulse 225 is reflected by the target 210, resulting in the reflected laser pulses 205 that are received by each of the unmanned aerial vehicles 200.

By using the laser method to designate target 210, the locations of the platforms (e.g., the locations of unmanned aerial vehicles 200) and target 210 do not have to be known with high accuracy (e.g., and the only communication between unmanned aerial vehicles 200 may include occasional synchronization of the clocks of the unmanned aerial vehicles 200, as described in more detail herein).

In some cases, the standoff range of unmanned aerial vehicles 200 may be, for example, greater than 2 km (e.g., to avoid small arms fire). In some cases, the standoff range of unmanned aerial vehicles 200 may be much greater than 2 km (e.g., to avoid anti-aircraft artillery). As such, HPM/HPRF attack may require a high electric field on a target 210 at the right frequency. As described in more detail herein, an array of sources (e.g., unmanned aerial vehicles 200) may thus be synchronized to increase the range of HPM/HPRF weapon systems. For instance, in the example of FIG. 2, multiple unmanned aerial vehicles 200 may highly synchronize HPM pulses 220 on a target 210 more efficiently, without necessarily communicating the locations of other unmanned aerial vehicles 200 and target 210.

In some aspects, unmanned aerial vehicles 200 may be examples of, or includes aspects of, high power radio frequency platforms as described with reference to FIGS. 1, 3, 5, and 9. Laser pulses 205 are examples of, or includes aspects of, the corresponding element described with reference to FIGS. 3 and 9. Target 210 is an example of, or includes aspects of, the corresponding element described with reference to FIGS. 3, 5, and 9. Radiated HPM pulse 220 is an example of, or includes aspects of, the corresponding elements described with reference to FIGS. 5 and 9. Laser pulse 225 is an example of, or includes aspects of, the corresponding elements described with reference to FIGS. 5 and 9.

Figure 3:
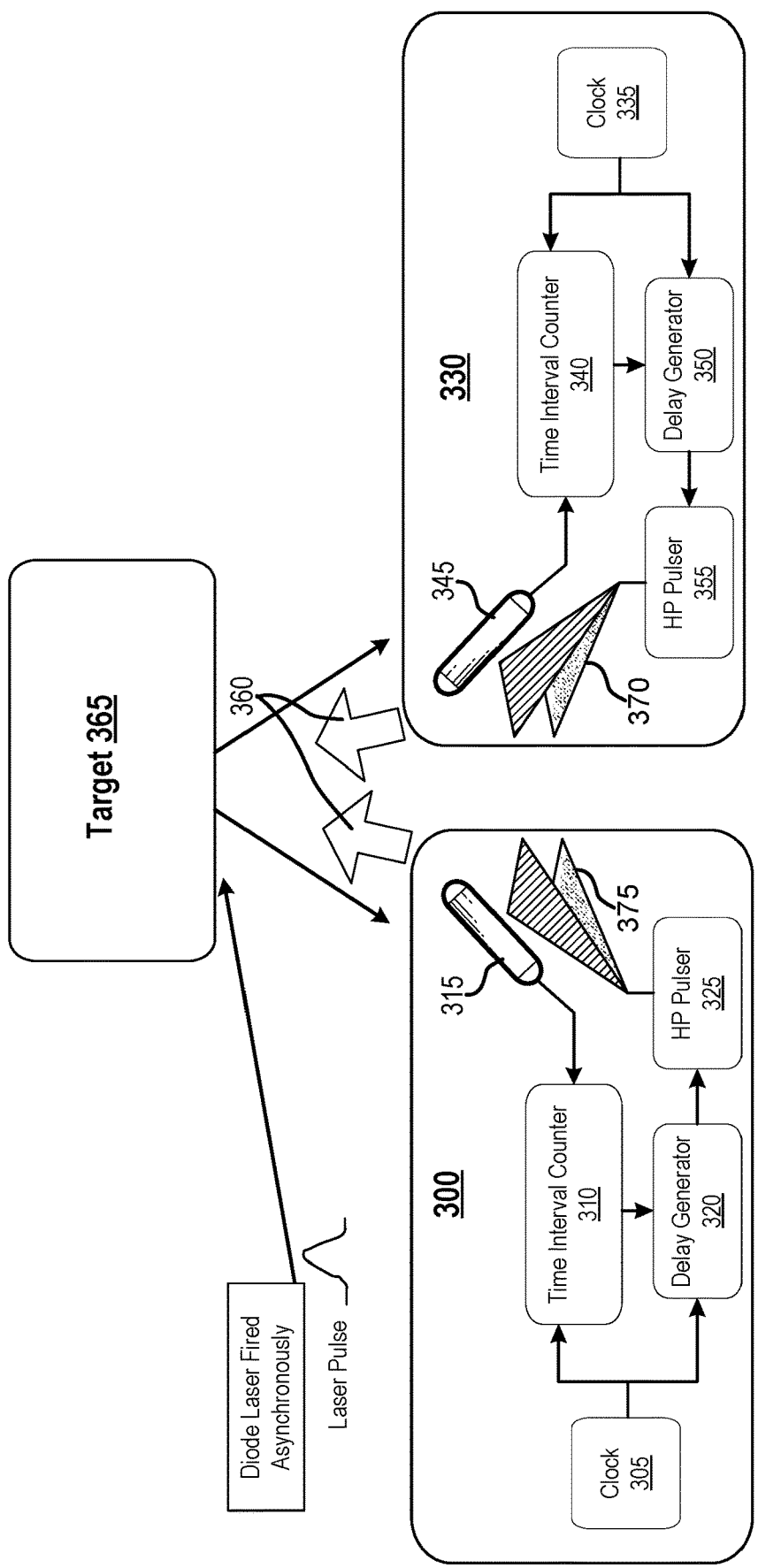

FIG. 3 shows an example of a system for synchronization of high power radio frequency sources according to aspects of the present disclosure. The example shown includes first high power radio frequency platform 300, second high power radio frequency platform 330, laser pulses 360, and target 365.

HPM weapons (e.g., or high power radiofrequency (HPRF) weapons) may have many advantages, such as providing non-lethal and no collateral damage (e.g., enabling "shoot first and ask questions later" tactics) and enabling wide attack areas at the speed of light. Further, HPM/HPRF weapons may be covert (e.g., adversaries may not even know a weapon was fired) and may hit many potential targets (e.g., such as urban infrastructure, vehicles, unmanned aerial vehicles (UAVs), etc.).

Generally, HPRF sources may be synchronized so the HPRF pulses arrive simultaneously on a target 365. Aspects of HPM/HPRF weapon systems may be varied and implemented by analogy in accordance with the techniques described herein. For instance, in various configurations, the HPRF frequency may be ~1 GHz, the standoff from target 365 may be greater than 1 km, there may be up to 10-100 platforms (e.g., depending on CONOPS), the inter-platform distance may be less than 1 km, the platform speeds may be less than 500 mph, there may be wireless inter-platform communication (e.g., including clock synchronization), etc.

First high power radio frequency platform 300 is an example of, or includes aspects of, the corresponding element described with reference to FIGS. 1 and 5. In one aspect, first high power radio frequency platform 300 includes first synchronized clock 305, first time interval counter 310, first photon detector 315, first delay generator 320, first high power radio frequency emission source 325, and first antenna 375.

First synchronized clock 305 is an example of, or includes aspects of, the corresponding element described with reference to FIGS. 1 and 4. First time interval counter 310 is an example of, or includes aspects of, the corresponding element described with reference to FIG. 4. First photon detector 315 is an example of, or includes aspects of, the corresponding element described with reference to FIGS. 1 and 4. First delay generator 320 is an example of, or includes aspects of, the corresponding element described with reference to FIGS. 1 and 4. First high power radio frequency emission source 325 is an example of, or includes aspects of, the corresponding element described with reference to FIG. 1.

Second high power radio frequency platform 330 is an example of, or includes aspects of, the corresponding element described with reference to FIGS. 1 and 5. In one aspect, second high power radio frequency platform 330 includes second synchronized clock 335, second time interval counter 340, second photon detector 345, second delay generator 350, second high power radio frequency emission source 355, and second antenna 370.

Second synchronized clock 335 is an example of, or includes aspects of, the corresponding element described with reference to FIG. 1. Second photon detector 345 is an example of, or includes aspects of, the corresponding element described with reference to FIG. 1. Second delay generator 350 is an example of, or includes aspects of, the corresponding element described with reference to FIG. 1. Second high power radio frequency emission source 355 is an example of, or includes aspects of, the corresponding element described with reference to FIG. 1.

Laser pulses 360 are examples of, or include aspects of, the corresponding element described with reference to FIG. 2. Target 365 is an example of, or includes aspects of, the corresponding element described with reference to FIGS. 2 and 5.

Figure 4:
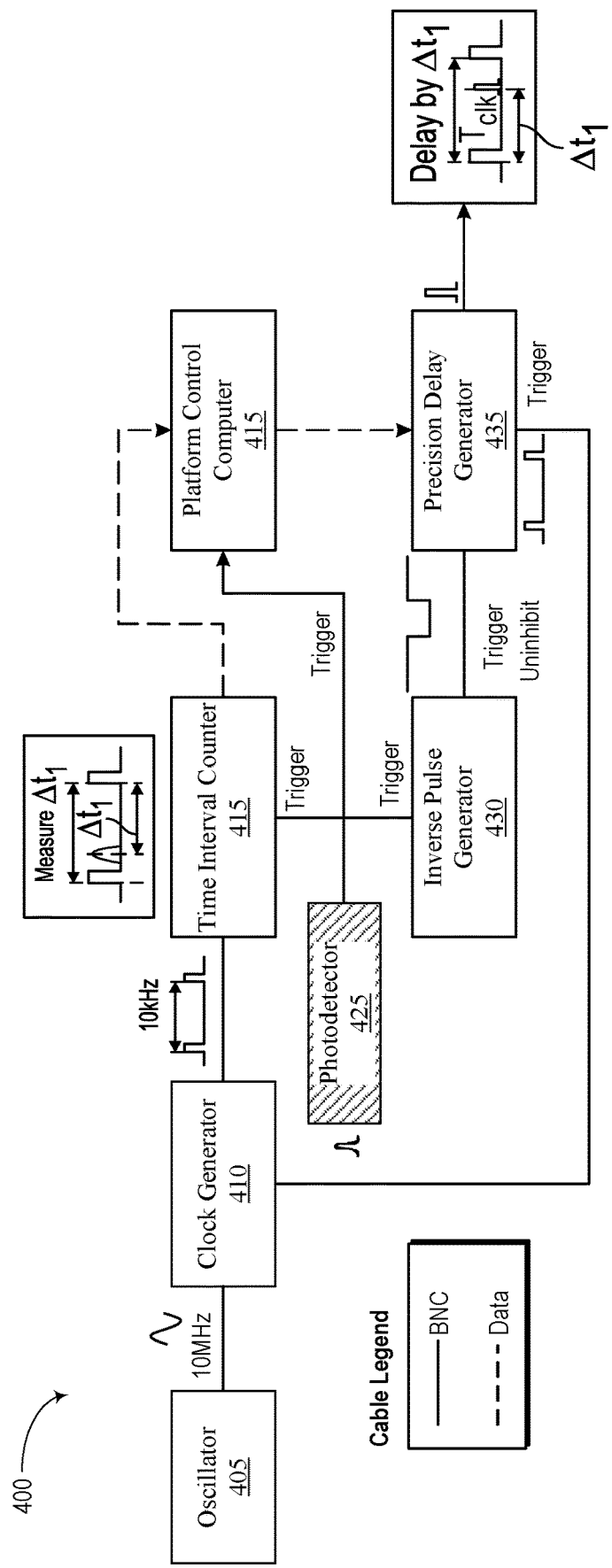
FIG. 4 shows an example of a synchronization circuit according to aspects of the present disclosure.

FIG. 4 shows an example of a synchronization circuit according to aspects of the present disclosure. The example shown includes first synchronized clock 400, first time interval counter 415, first platform control computer 420, first photon detector 425, first inverse pulse generator 430, and first delay generator 435.

In some aspects, a fundamental component of the first synchronized clock 400 may include a first precision oscillator 405 (e.g., the first precision oscillator 405 may maintain the time with a high degree of accuracy and may be synchronized with precision oscillators on other high power radio frequency platforms).

In some examples, the first synchronized clock 400 may include a clock generator. The clock generator may convert output from the first precision oscillator 405 (e.g., a 10 MHz sine wave output from the first prevision oscillator) to a pulse train at a lower frequency. The pulse train may be sent to both the first time interval counter 415 and the first delay generator 435 (e.g., a precision delay generator). FIG. 4 may illustrate an example where the frequency is 10 kHz, however the frequency may be higher or lower depending on how the system is implemented. In some cases, the first clock generator 410 may generate the pulse train by counting sine wave cycles from the first precision oscillator 405 (e.g., for every 1000 sine wave cycles the first clock generator 410 may produce 1 pulse). As such, if oscillators are synchronized on multiple high power radio frequency platforms, the generated pulse trains may also be synchronized.

The first photon detector 425 may detect the laser pulse reflected off the target. Further, the first photon detector 425 may respond to the detected laser pulse by sending a digital trigger pulse out to the first time interval counter 415, the first inverse pulse generator 430, and the first platform control computer 420 (e.g., therefore alerting them that a laser pulse has been detected).

The first time interval counter 415 measures the time between receiving the trigger pulse from the Photodetector and the next pulse from the clock generator, $\Delta t_1$. Further, the first time interval counter 415 may send the value of $\Delta t$ to the first platform control computer 420.

The first inverse pulse generator 430 may output a continuous signal (e.g., a DC 5 V signal) to the first delay generator 435 (e.g., to suppress its output). Upon receiving the trigger pulse from a Photodetector (e.g., the first photon detector 425), the first inverse pulse generator 430 may wait for a predetermined time interval (e.g., to give the first platform control computer 420 time to perform data processing operations). Next, the first inverse pulse generator 430 may lower its output signal (e.g., to 0V) for a time equal to the period of the pulse train of the first clock generator 410. As such, the first delay generator 435 may send out a single pulse during this time.

Upon receiving the trigger pulse from the first photon detector 425, the first platform control computer 420 may read the value of $\Delta t_1$ measured by the first time interval counter 415. The first platform control computer 420 may then send the $\Delta t_1$ value to the first delay generator 435.

When the signal from the first inverse pulse generator 430 drops (e.g., to 0 V), the first delay generator 435 may send a trigger pulse to the HPM system at a time $\Delta t_1$ after receiving the next pulse from the first clock generator 410. In some examples, such may trigger the HPM system to fire.

In some examples, an oscillator (e.g. a Microsemi© oscillator) may be used as a timebase for all instruments. Oscillators on each platform may be linked by fiber optic (e.g., and may automatically be synced at 1 Hz with 6 ps accuracy).

It should be noted that the accuracy of the synchronization is limited by the time accuracy of the different components in the synchronization circuit. Jitter in the firing of the source (i.e. random time variations between receiving a trigger and the source firing) is one of the main sources of timing error. It is advantageous to have high accuracy, low jitter instruments in the synchronization circuit.

First synchronized clock 400 is an example of, or includes aspects of, the corresponding element described with reference to FIGS. 1 and 3. In one aspect, first synchronized clock 400 includes first precision oscillator 405 and first clock generator 410.

First time interval counter 415 is an example of, or includes aspects of, the corresponding element described with reference to FIG. 3. First platform control computer 420 is an example of, or includes aspects of, the corresponding element described with reference to FIG. 1. First photon detector 425 is an example of, or includes aspects of, the corresponding element described with reference to FIGS. 1 and 3. First delay generator 435 is an example of, or includes aspects of, the corresponding element described with reference to FIGS. 1 and 3.

Figure 5:
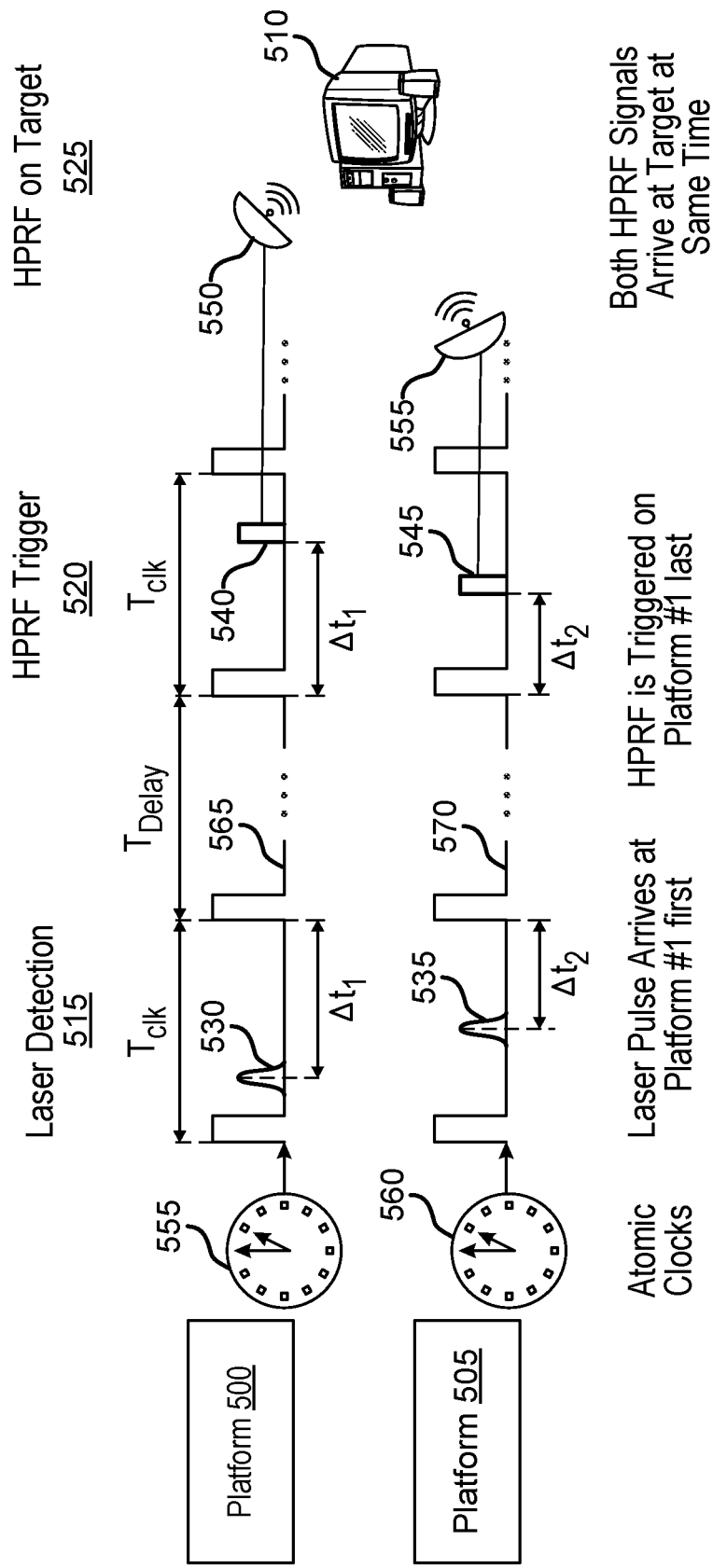
FIG. 5 shows an example of a system for synchronization of high power radio frequency sources according to aspects of the present disclosure.

FIG. 5 shows an example of a system for synchronization of high power radio frequency sources according to aspects of the present disclosure. The example shown includes first high power radio frequency platform 500, second high power radio frequency platform 505, target 510, laser detection stage 515, HPRF trigger stage 520, HPRF on target stage 525, first platform laser pulse 530, second platform laser pulse 535, first platform HPRF trigger 540, second platform HPRF trigger 545, first platform high power radio frequency emission 550, second platform high power radio frequency emission 555, first platform atomic clock 555, second platform atomic clock 560, first platform clock pulse train 565, second platform clock pulse train 570.

In the example shown in FIG. 5, first platform 500 is closer to target 510 and therefore during the initial Laser Detection stage 515 receives first platform reflected laser pulse 530 at an earlier time than the second platform 505 received the second platform reflected laser pulse 535. As a result, time length $\Delta t_1$ between the first platform laser pulse 530 and the next occurring clock pulse of the first platform clock pulse train 565 is longer than time length $\Delta t_2$ between the second platform laser pulse 535 and the next occurring clock pulse of the first platform clock pulse train 570.

During the HPRF trigger stage 520, at a time after both platforms 500, 505 have registered at least one clock pulse after first receiving the laser pulse 530, 535, an instruction is received to trigger the HPRF emission source after a specified clock pulse. Accordingly, first platform HPRF trigger 540 occurs at a time $\Delta t_1$ after the specified clock pulse, resulting in first platform high power radio frequency emission 550. Second platform HPRF trigger 545 occurs at a time $\Delta t_2$ after the specified clock pulse, resulting in second platform high power radio frequency emission 555.

During HPRF on Target state 525, due to the staggered trigger times, both emission pulses 550, 555 arrive at the target 510 at substantially the same time (i.e. substantially simultaneously).

As described herein, a laser pulse may trigger first high power radio frequency platform 500 and second high power radio frequency platform 505 independently. However, communicating velocity and position between first high power radio frequency platform 500 and second high power radio frequency platform 505 is not necessary (e.g., as only occasional synchronization of the atomic clocks of first high power radio frequency platform 500 and second high power radio frequency platform 505 may be necessary).

First high power radio frequency platform 500 is an example of, or includes aspects of, the corresponding element described with reference to FIGS. 1 and 3. Second high power radio frequency platform 505 is an example of, or includes aspects of, the corresponding element described with reference to FIGS. 1 and 3. Target 510 is an example of, or includes aspects of, the corresponding element described with reference to FIGS. 2 and 3.

Figure 6:
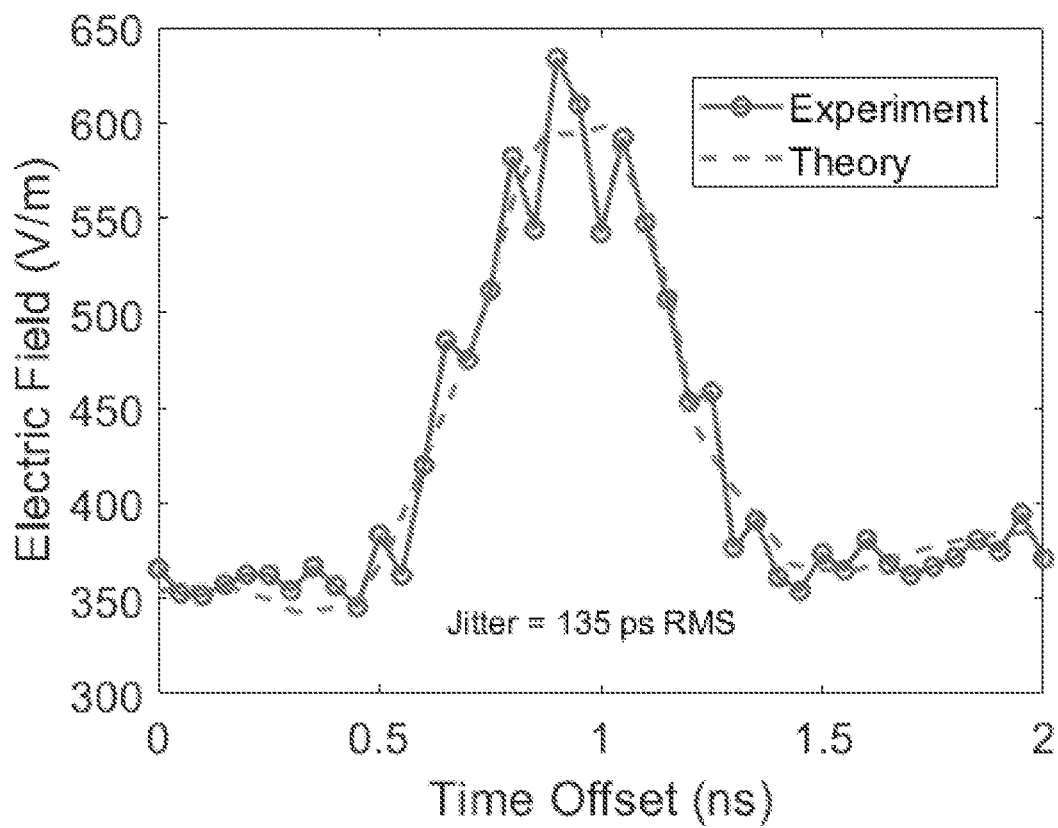
FIG. 6 shows an example of a high power radio frequency source synchronization diagram according to aspects of the present disclosure.

FIG. 6 shows an example of a high power radio frequency source synchronization diagram 600 according to aspects of the present disclosure. FIG. 6 may illustrate aspects of time offset on the x-axis and electric field on the y-axis.

The diagram shows predicted (theory) and actual (experiment) values for electric field vs. time offset between two 0.5 ns wide, 350 V/m intensity, HPM pulses. The pulses are radiated from antennas that are different distances from the target. The curves show the average value of the peak electric field. The experimental curve shows the average value measured over 8 HPM shots per time offset. The theoretical curve shows the average value calculated from the measured waveforms and the root mean square jitter of 135 ps. The high power radio frequency source synchronization diagram 600 illustrates that synchronization of sources may nearly double the electric field on a target.

Figure 7:
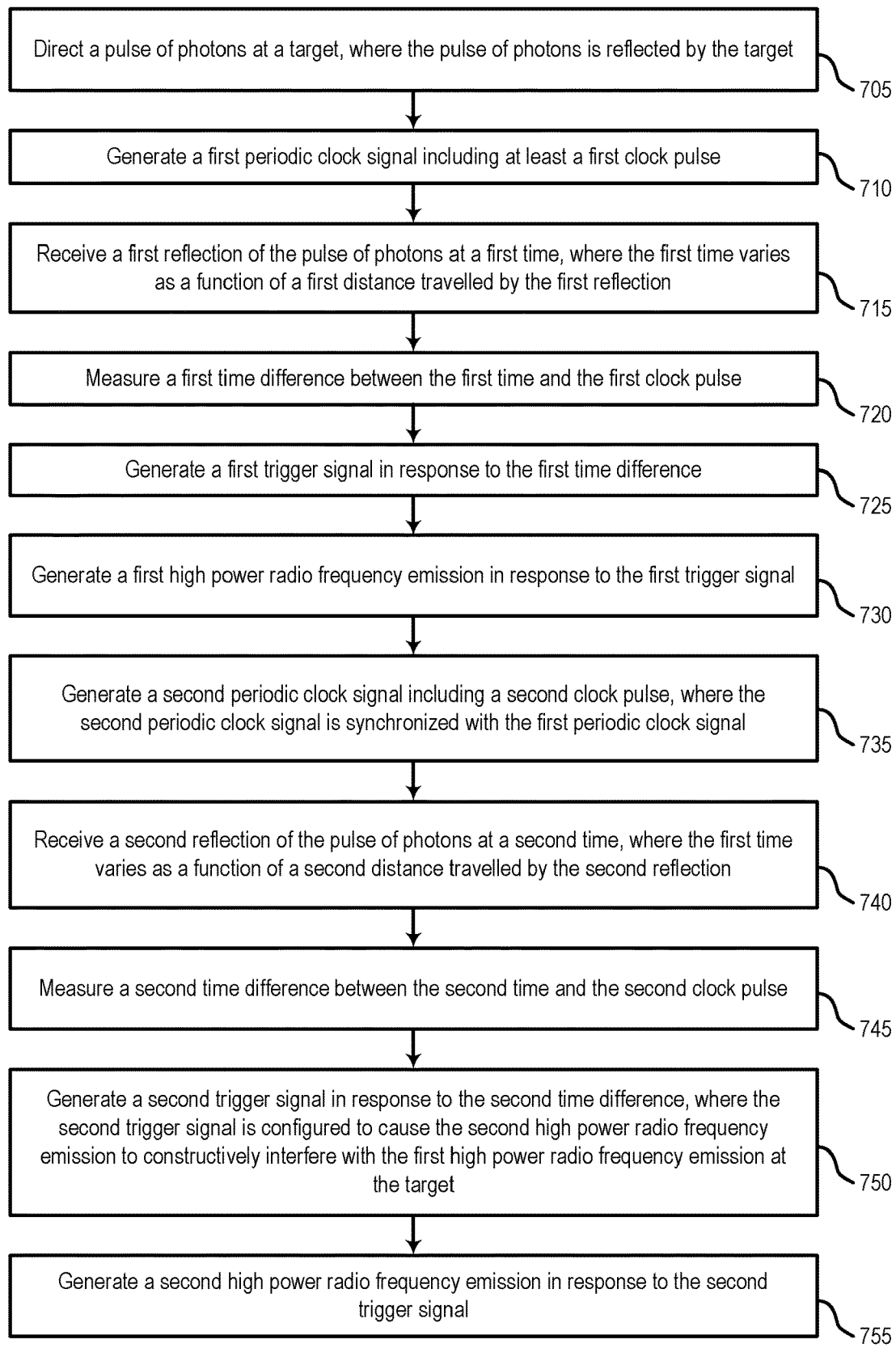
FIGS. 7 through 8 show examples of a process for electromagnetic systems according to aspects of the present disclosure.

FIG. 7 shows an example of a method 700 for electromagnetic systems according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system directs a pulse of photons at a target, where the pulse of photons is reflected by the target. In some cases, the operations of this step refer to, or may be performed by, directional photon source as described with reference to FIG. 1.

At operation 710, the system generates a first periodic clock signal including at least a first clock pulse. In some cases, the operations of this step refer to, or may be performed by, first synchronized clock as described with reference to FIGS. 1, 3, and 4.

At operation 715, the system receives a first reflection of the pulse of photons at a first time, where the first time varies as a function of a first distance travelled by the first reflection. In some cases, the operations of this step refer to, or may be performed by, first photon detector as described with reference to FIGS. 1, 3, and 4.

At operation 720, the system measures a first time difference between the first time and a first clock pulse of the first periodic clock signal, wherein the first clock pulse is the next first periodic clock signal pulse after the first time. In some cases, the operations of this step refer to, or may be performed by, first triggering system as described with reference to FIG. 1.

At operation 725, the system generates a first trigger signal in response to the first time difference. In some cases, the operations of this step refer to, or may be performed by, first triggering system as described with reference to FIG. 1.

At operation 730, the system generates a first high power radio frequency emission in response to the first trigger signal. In some cases, the operations of this step refer to, or may be performed by, first high power radio frequency emission source as described with reference to FIGS. 1 and 3.

At operation 735, the system generates a second periodic clock signal including a second clock pulse, where the second periodic clock signal is synchronized with the first periodic clock signal. In some cases, the operations of this step refer to, or may be performed by, second synchronized clock as described with reference to FIGS. 1 and 3.

At operation 740, the system receives a second reflection of the pulse of photons at a second time, where the second time varies as a function of a second distance travelled by the second reflection. In some cases, the operations of this step refer to, or may be performed by, second photon detector as described with reference to FIGS. 1 and 3.

At operation 745, the system measures a second time difference between the second time and a second clock pulse of the second periodic clock signal, wherein the second clock pulse is the next second periodic clock signal pulse after the second time. In some cases, the operations of this step refer to, or may be performed by, second triggering system as described with reference to FIG. 1.

At operation 750, the system generates a second trigger signal in response to the second time difference, where the second trigger signal is configured to cause the second high power radio frequency emission to constructively interfere with the first high power radio frequency emission at the target. In some cases, the operations of this step refer to, or may be performed by, second triggering system as described with reference to FIG. 1.

At operation 755, the system generates a second high power radio frequency emission in response to the second trigger signal. In some cases, the operations of this step refer to, or may be performed by, second high power radio frequency emission source as described with reference to FIGS. 1 and 3.

Figure 8:
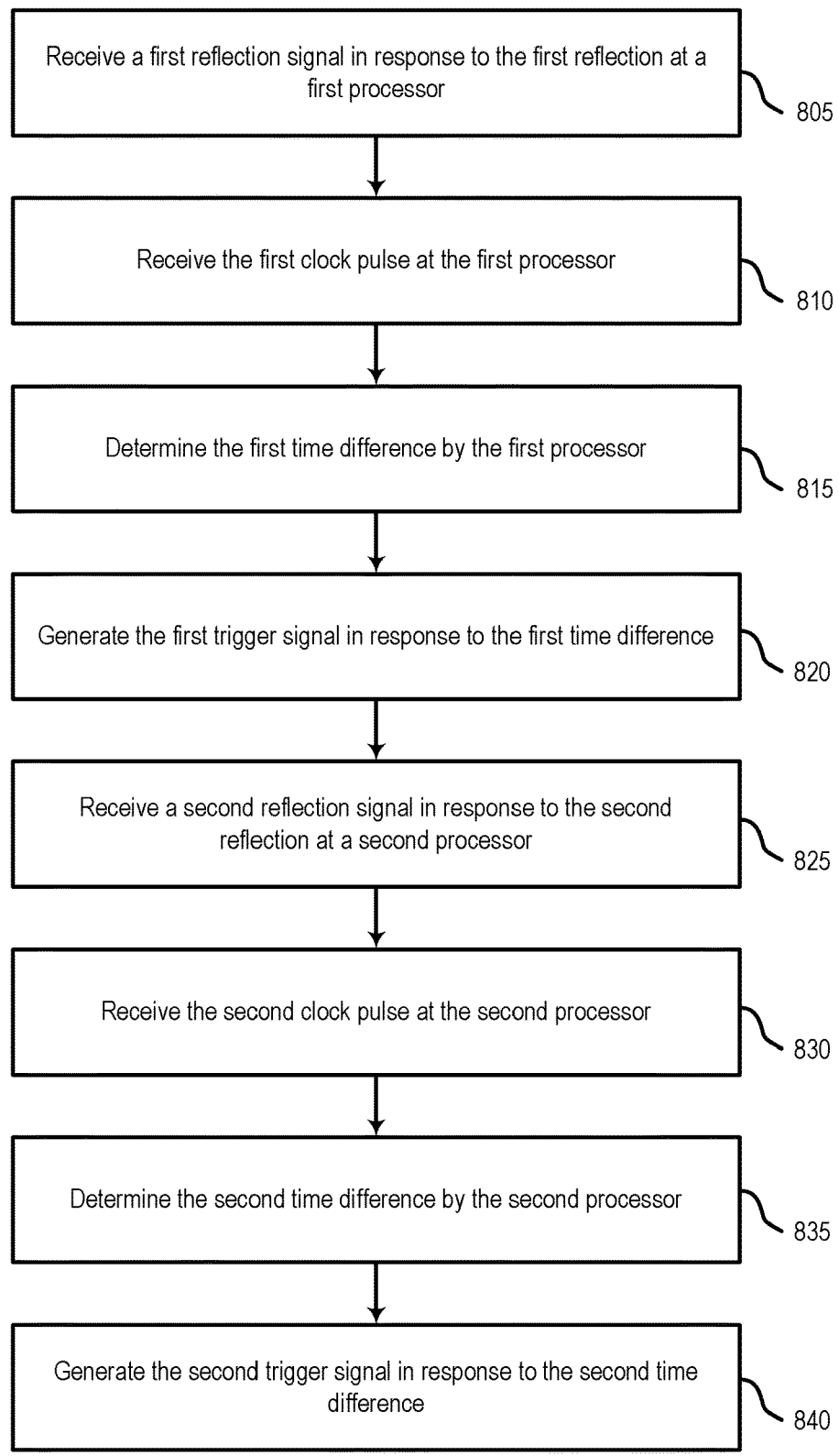

FIG. 8 shows an example of 800 for electromagnetic systems according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a first reflection signal in response to the first reflection at a first processor. In some cases, the operations of this step refer to, or may be performed by, first platform control computer as described with reference to FIGS. 1 and 4.

At operation 810, the system receives the first clock pulse at the first processor. In some cases, the operations of this step refer to, or may be performed by, first platform control computer as described with reference to FIGS. 1 and 4.

At operation 815, the system determines the first time difference by the first processor. In some cases, the operations of this step refer to, or may be performed by, first platform control computer as described with reference to FIGS. 1 and 4.

At operation 820, the system generates the first trigger signal in response to the first time difference. In some cases, the operations of this step refer to, or may be performed by, first delay generator as described with reference to FIGS. 1, 3, and 4.

At operation 825, the system receives a second reflection signal in response to the second reflection at a second processor. In some cases, the operations of this step refer to, or may be performed by, second platform control computer as described with reference to FIG. 1.

At operation 830, the system receives the second clock pulse at the second processor. In some cases, the operations of this step refer to, or may be performed by, second platform control computer as described with reference to FIG. 1.

At operation 835, the system determines the second time difference by the second processor. In some cases, the operations of this step refer to, or may be performed by, second platform control computer as described with reference to FIG. 1.

At operation 840, the system generates the second trigger signal in response to the second time difference. In some cases, the operations of this step refer to, or may be performed by, second delay generator as described with reference to FIGS. 1 and 3.

Figure 9:
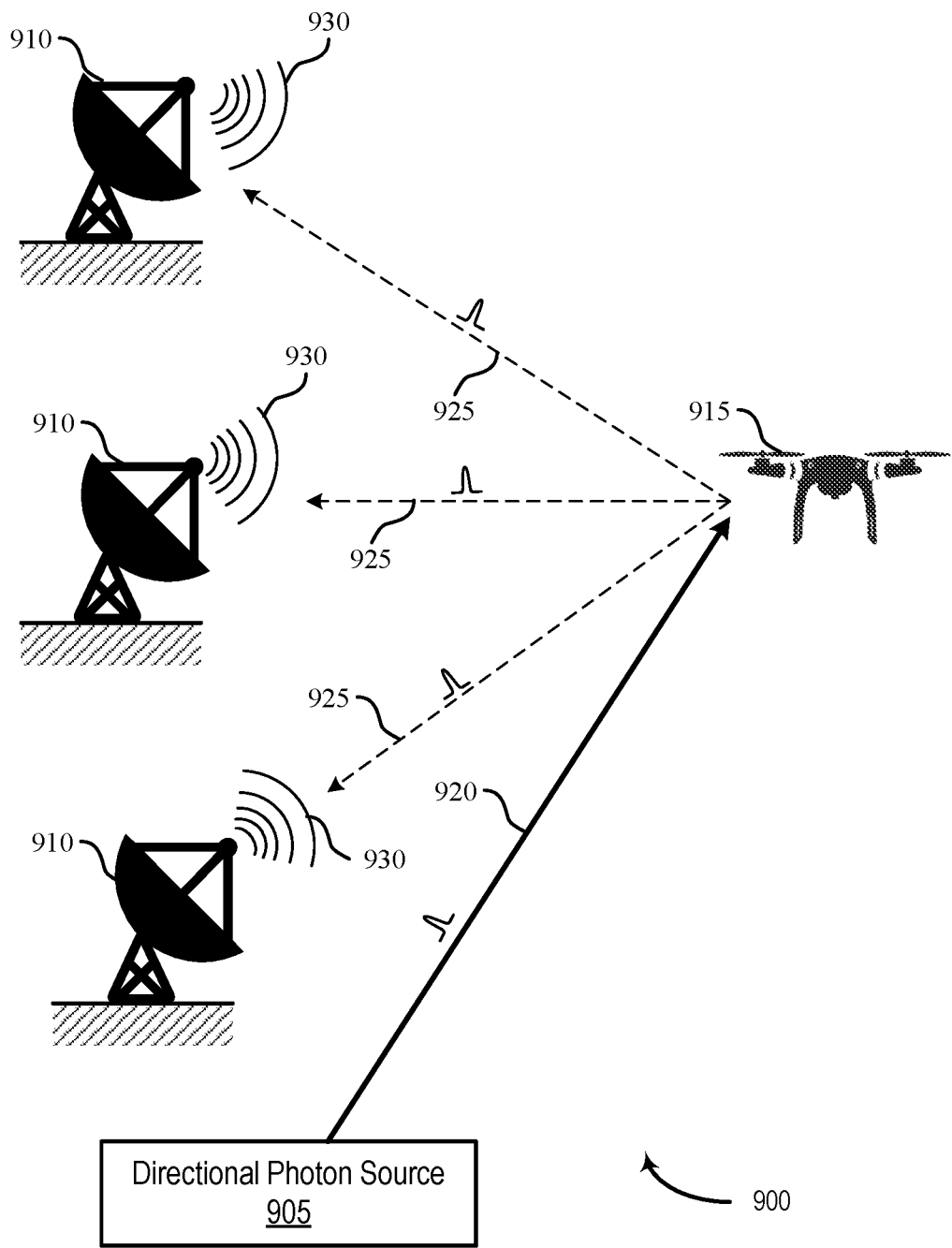
FIG. 9 shows an example of a system for synchronization of high power radio frequency sources according to aspects of the present disclosure.

FIG. 9 shows an example of a system 900 for synchronization of high power radio frequency sources according to aspects of the present disclosure. The example shown includes a directional photon source 905, a plurality of stationary high power radio frequency platforms 910, a target 915, a laser pulse 920, a plurality of reflected laser pulses 925, and a plurality of HPRF emissions 930.

The system 900 illustrates yet another embodiment of a system for synchronization of high power radio frequency sources according to aspects of the present disclosure. In the embodiment shown in FIG. 9, the high power radio frequency platforms 910 are stationary high power radio frequency platforms, as opposed to the movable platforms 200 shown in FIG. 2.

The system 900 operates in essentially the same manner and with essentially the same equipment as previously described: the directional photon source 905 sends the laser pulse 920 to the target 915. The target 915 reflects the laser pulse 920, resulting in the reflected laser pulses 925 being received by the stationary high power radio frequency platforms 910. Each high power radio frequency platforms 910 then calculates the time difference between receiving the laser pulse and the next occurring clock pulse, and times the HPRF emission 930 based on the time difference, resulting in synchronization between the plurality of high power radio frequency platforms 910.

One advantage of the overall synchronization system is that the high power radio frequency platforms (movable or stationary) do not need to know the exact location and speed of the other high power radio frequency platforms or the target in order to operate. Accordingly, the combination of movable high power radio frequency platforms and a moving target is yet another embodiment of the synchronization system. High power radio frequency platforms and/or target embodiments contemplated include, but are not limited to, unmanned aerial vehicles (e.g. drones), motor vehicles, and boats.

Accordingly, the present disclosure includes the following aspects.

An apparatus for synchronization of high power radiofrequency sources is described. One or more aspects of the apparatus include a directional photon source configured to direct a pulse of photons at a target, wherein the pulse of photons is reflected by the target; a first high power radio frequency platform; a first synchronized clock, generating a first periodic clock signal comprising at least a first clock pulse; a first high power radio frequency emission source, generating a first high power radio frequency emission in response to a first trigger signal; a first photon detector configured to receive a first reflection of the pulse of photons at a first time, wherein the first time varies as a function of a first distance travelled by the first reflection; a first triggering system configured to measure a first time difference between the first time and a first clock pulse of the first periodic clock signal, wherein the first clock pulse is the next first periodic clock signal pulse after the first time, and further configured to generate the first trigger signal in response to the first time difference; a second high power radio frequency platform; a second synchronized clock, generating a second periodic clock signal comprising a second clock pulse, wherein the second periodic clock signal is synchronized with the first periodic clock signal; a second high power radio frequency emission source, generating a second high power radio frequency emission in response to a second trigger signal; a second photon detector configured to receive a second reflection of the pulse of photons at a second time, wherein the second time varies as a function of a second distance travelled by the second reflection; and a second triggering system configured to measure a second time difference between the second time and a second clock pulse of the second periodic clock signal, wherein the second clock pulse is the next second periodic clock signal pulse after the second time, and further configured to generate the second trigger signal in response to the second time difference, wherein the second trigger signal is configured to cause the second high power radio frequency emission source to generate the second high power radio frequency emission to constructively interfere with the first high power radio frequency emission at the target.

In some aspects, the directional photon source is a laser.

In some aspects, the first high power radio frequency platform and the second high power radio frequency platform are less than one kilometer apart from one another.

In some aspects, the first high power radio frequency platform and the second high power radio frequency platform have respective speeds of less than five hundred kilometers per hour relative to Earth.

In some aspects, the first high power radio frequency platform comprises a first communications interface, wherein the first communications interface is configured to provide synchronization information to the first synchronized clock. In some aspects, the second high power radio frequency platform comprises a second communications interface, wherein the second communications interface is configured to provide the synchronization information to the second synchronized clock, wherein the second communications interface is coupled to the first communications interface via a communications channel, and wherein the synchronization information is communicated via the communications channel.

In some aspects, the first triggering system comprises a first platform control computer and a first delay generator.

In some aspects, the first platform control computer is configured to receive a first reflection signal in response to the first reflection, receive the first clock pulse from the first synchronized clock, and determine the first time difference.

In some aspects, the first delay generator is coupled to the first platform control computer and is configured to generate the first trigger signal in response to the first time difference.

In some aspects, the second triggering system comprises a second platform control computer and a second delay generator.

In some aspects, the second platform control computer is configured to receive a second reflection signal in response to the second reflection, receive the second clock pulse from the second synchronized clock, and determine the second time difference.

In some aspects, the second delay generator is coupled to the second platform control computer and is configured to generate the second trigger signal in response to the second time difference.

In some aspects, the first high power radio frequency platform is coupled to a first unmanned aerial vehicle. In some aspects, the second high power radio frequency platform is coupled to a second unmanned aerial vehicle.

A method for synchronization of high power radiofrequency sources is described. One or more aspects of the method include directing a pulse of photons at a target, wherein the pulse of photons is reflected by the target; generating a first periodic clock signal comprising at least a first clock pulse; receiving a first reflection of the pulse of photons at a first time, wherein the first time varies as a function of a first distance travelled by the first reflection; a first time difference between the first time and a first clock pulse of the first periodic clock signal, wherein the first clock pulse is the next first periodic clock signal pulse after the first time; generating a first trigger signal in response to the first time difference; generating a first high power radio frequency emission in response to the first trigger signal; generating a second periodic clock signal comprising a second clock pulse, wherein the second periodic clock signal is synchronized with the first periodic clock signal; receiving a second reflection of the pulse of photons at a second time, wherein the second time varies as a function of a second distance travelled by the second reflection; measuring a second time difference between the second time and a second clock pulse of the second periodic clock signal, wherein the second clock pulse is the next second periodic clock signal pulse after the second time; generating a second trigger signal in response to the second time difference, wherein the second trigger signal is configured to cause the second high power radio frequency emission to constructively interfere with the first high power radio frequency emission at the target; and generating a second high power radio frequency emission in response to the second trigger signal.

In some aspects, the directing the pulse of photons at the target comprises directing the pulse of photons using a laser.

In some aspects, the generating the first high power radio frequency emission in response to the first trigger signal, and the generating the second high power radio frequency emission in response to the second trigger signal, comprises generating the first high power radio frequency emission and generating the second high power radio frequency emission at respective locations less than one kilometer apart from one another.

In some aspects, the generating the first high power radio frequency emission in response to the first trigger signal, and the generating the second high power radio frequency emission in response to the second trigger signal, comprises generating the first high power radio frequency emission and generating the second high power radio frequency emission on respective platforms moving at respective speeds of less than five hundred kilometers per hour relative to Earth.

Some examples of the method further include providing a first communications interface, wherein the first communications interface is configured to provide synchronization information to a first synchronized clock that generates the first periodic clock signal. Some examples further include providing a second communications interface, wherein the second communications interface is configured to provide the synchronization information to a second synchronized clock that generates the second periodic clock signal, wherein the second communications interface is coupled to the first communications interface via a communications channel, and wherein the synchronization information is communicated via the communications channel.

Some examples of the method further include receiving a first reflection signal in response to the first reflection at a first processor. Some examples further include receiving the first clock pulse at the first processor. Some examples further include determining the first time difference by the first processor. Some examples further include generating the first trigger signal in response to the first time difference. Some examples further include receiving a second reflection signal in response to the second reflection at a second processor. Some examples further include receiving the second clock pulse at the second processor. Some examples further include determining the second time difference by the second processor. Some examples further include generating the second trigger signal in response to the second time difference.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for synchronization of high power radio frequency sources comprising:
   a directional photon source configured to direct a pulse of photons at a target, wherein the pulse of photons is reflected by the target;
   a first high power radio frequency platform comprising:
      a first synchronized clock, generating a first periodic clock signal,
      a first high power radio frequency emission source, generating a first high power radio frequency emission in response to a first trigger signal,
      a first photon detector configured to receive a first reflection of the pulse of photons at a first time, wherein the first time varies as a function of a first distance travelled by the first reflection, and
      a first triggering system configured to measure a first time difference between the first time and a first clock pulse of the first periodic clock signal, wherein the first clock pulse is the next first periodic clock signal pulse after the first time, the first triggering system further configured to generate the first trigger signal at the first time difference after a second clock pulse of the first periodic clock signal, wherein the second clock pulse is after the first clock pulse, whereby the first high power radio frequency emission source is fired at the first time difference after the second clock pulse of the first periodic clock signal; and
   a second high power radio frequency platform comprising:
      a second synchronized clock, generating a second periodic clock signal, wherein the second periodic clock signal is synchronized with the first periodic clock signal,
      a second high power radio frequency emission source, generating a second high power radio frequency emission in response to a second trigger signal,
      a second photon detector configured to receive a second reflection of the pulse of photons at a second time, wherein the second time varies as a function of a second distance travelled by the second reflection, and
      a second triggering system configured to measure a second time difference between the second time and a third clock pulse of the second periodic clock signal, wherein the third clock pulse is the next second periodic clock signal pulse after the second time, the second triggering system further configured to generate the second trigger signal at the second time difference after a fourth clock pulse of the second periodic clock signal, wherein the fourth clock pulse is after the third clock pulse and coincides with the second clock pulse of the first periodic clock signal, whereby the first high power radio frequency emission source is fired at the second time difference after the fourth clock pulse of the second periodic clock signal, wherein the second trigger signal is configured to cause the second high power radio frequency emission source to generate the second high power radio frequency emission to constructively interfere with the first high power radio frequency emission at the target.

2. The system for synchronization of high power radio frequency sources of claim 1 wherein said directional photon source is a laser.

3. The system for synchronization of high power radio frequency sources of claim 1 wherein the first triggering system and the second triggering system are further configured to receive sensor data and use the sensor data to reduce timing errors.

4. The system for synchronization of high power radio frequency sources of claim 3 wherein the sensor data is at least one of platform speed, platform altitude, air pressure, temperature, and humidity.

5. The system for synchronization of high power radio frequency sources of claim 1 further comprising:
   said first high power radio frequency platform comprising:
      a first communications interface, wherein the first communications interface is configured to provide synchronization information to said first synchronized clock; and
   said second high power radio frequency platform comprising:
      a second communications interface, wherein the second communications interface is configured to provide the synchronization information to said second synchronized clock, wherein the second communications interface is coupled to the first communications interface via a communications channel, wherein said synchronization information is communicated via the communications channel.

6. The system for synchronization of high power radio frequency sources of claim 1 further comprising:
   said first high power radio frequency platform comprising:
      said first triggering system comprising:
         a first platform control computer configured to receive a first reflection signal in response to the first reflection and receive the first clock pulse from the first synchronized clock, and configured to determine said first time difference, and
         a first delay generator, coupled to the first platform control computer, configured to generate said first trigger signal in response to said first time difference; and
   said second high power radio frequency platform comprising:
      said second triggering system comprising:
         a second platform control computer configured to receive a second reflection signal in response to the second reflection and receive the third clock pulse from the second synchronized clock, and configured to determine said second time difference, and
         a second delay generator, coupled to the second platform control computer, configured to generate said second trigger signal in response to said second time difference.

7. The system for synchronization of high power radio frequency sources of claim 1 further comprising:
   said first high power radio frequency platform, wherein said first high power radio frequency platform is coupled to a first vehicle.

8. The system for synchronization of high power radio frequency sources of claim 7 further comprising:

said second high power radio frequency platform, wherein said second high power radio frequency platform is coupled to a second vehicle.

9. The system for synchronization of high power radio frequency sources of claim 1, wherein at least one of the first high power radio frequency platform and the second high power radio frequency platform is a stationary platform.

10. The system for synchronization of high power radio frequency sources of claim 1, wherein at least one of the first high power radio frequency platform and the second high power radio frequency platform is a movable platform.

11. The system for synchronization of high power radio frequency sources of claim 1, wherein the target is a stationary target.

12. The system for synchronization of high power radio frequency sources of claim 1, wherein the target is a moving target.

13. The system for synchronization of high power radio frequency sources of claim 12, wherein the moving target is one of an unmanned aerial vehicle, a motor vehicle, and a boat.

14. The system for synchronization of high power radio frequency sources of claim 1, further comprising:
wherein the generating of the first trigger signal in response to the first time difference further comprises generating the first trigger signal after the first clock pulse; and
wherein the generating of the second trigger signal in response to the second time difference further comprises generating the second trigger signal after the third clock pulse.

15. A method for synchronization of high power radio frequency sources comprising:
directing a pulse of photons at a target, wherein the pulse of photons is reflected by the target;
generating a first periodic clock signal;
receiving a first reflection of the pulse of photons at a first time, wherein the first time varies as a function of a first distance travelled by the first reflection;
measuring a first time difference between the first time and a first clock pulse of the first periodic clock signal, wherein the first clock pulse is the next first periodic clock signal pulse after the first time;
generating a first trigger signal at the first time difference after a second clock pulse of the first periodic clock signal, wherein the second clock pulse is after the first clock pulse, wherein the first high power radio frequency emission source is fired at the first time difference after the second clock pulse of the first periodic clock signal;
generating a first high power radio frequency emission in response to the-firing of the first high power emission source;
generating a second periodic clock signal, wherein the second periodic clock signal is synchronized with the first periodic clock signal;
receiving a second reflection of the pulse of photons at a second time, wherein the second time varies as a function of a second distance travelled by the second reflection;
measuring a second time difference between the second time and a third clock pulse of the second periodic clock signal, wherein the third clock pulse is the next second periodic clock signal pulse after the second time;
generating a second trigger signal at the second time difference after a fourth clock pulse of the second periodic clock signal, wherein the fourth clock pulse is after the third clock pulse and coincides with the second clock pulse of the first periodic clock signal, wherein the first high power radio frequency emission source is fired at the second time difference after the fourth clock pulse of the second periodic clock signal; and
generating a second high power radio frequency emission in response to the firing of the second high power radio frequency emission source, wherein the second trigger signal is configured to cause the second high power radio frequency emission to constructively interfere with the first high power radio frequency emission at the target.

16. The method for synchronization of high power radio frequency sources of claim 15 wherein said directing said pulse of photons at said target comprises directing said pulse of photons using a laser.

17. The method for synchronization of high power radio frequency sources of claim 15 further comprising:
providing a first communications interface, wherein the first communications interface is configured to provide synchronization information to a first synchronized clock that generates the first periodic clock signal; and
providing a second communications interface, wherein the second communications interface is configured to provide the synchronization information to a second synchronized clock that generates the second periodic clock signal, wherein the second communications interface is coupled to the first communications interface via a communications channel, wherein said synchronization information is communicated via the communications channel.

18. The method for synchronization of high power radio frequency sources of claim 15 further comprising:
receiving a first reflection signal in response to the first reflection at a first processor;
receive the first clock pulse at the first processor;
determining said first time difference by the first processor;
generating said first trigger signal in response to said first time difference;
receiving a second reflection signal in response to the second reflection at a second processor;
receiving the third clock pulse at the second processor;
determining said second time difference by the second processor; and
generating said second trigger signal in response to said second time difference.

19. The method for synchronization of high power radio frequency sources of claim 15, wherein the target is a stationary target.

20. The method for synchronization of high power radio frequency sources of claim 15, wherein the target is a moving target.

21. The method for synchronization of high power radio frequency sources of claim 20, wherein the moving target is one of an unmanned aerial vehicle, a motor vehicle, and a boat.

22. The method for synchronization of high power radio frequency sources of claim 15, further comprising:
wherein the generating of the first trigger signal in response to the first time difference further comprises generating the first trigger signal after the first clock pulse; and wherein the generating of the second trigger signal in response to the second time difference further comprises generating the second trigger signal after the third clock pulse.

* * * * *

UNITED STATES PATENT AND TRADEMARK OFFICE
CERTIFICATE OF CORRECTION

PATENT NO. : 11,946,726 B2
APPLICATION NO. : 17/874132
DATED : April 2, 2024
INVENTOR(S) : Staines et al.

It is certified that error appears in the above-identified patent and that said Letters Patent is hereby corrected as shown below:

On the Title Page

The illustrative Fig., and in the Drawings, Fig. 1, for Reference Numeral "145", delete "First" and insert --Second--.

Signed and Sealed this
Twenty-seventh Day of August, 2024

Katherine Kelly Vidal
*Director of the United States Patent and Trademark Office*